J. F. PRIBNOW.
SHAPER.
APPLICATION FILED FEB. 7, 1910.
972,913.
Patented Oct. 18, 1910.
2 SHEETS—SHEET 1.
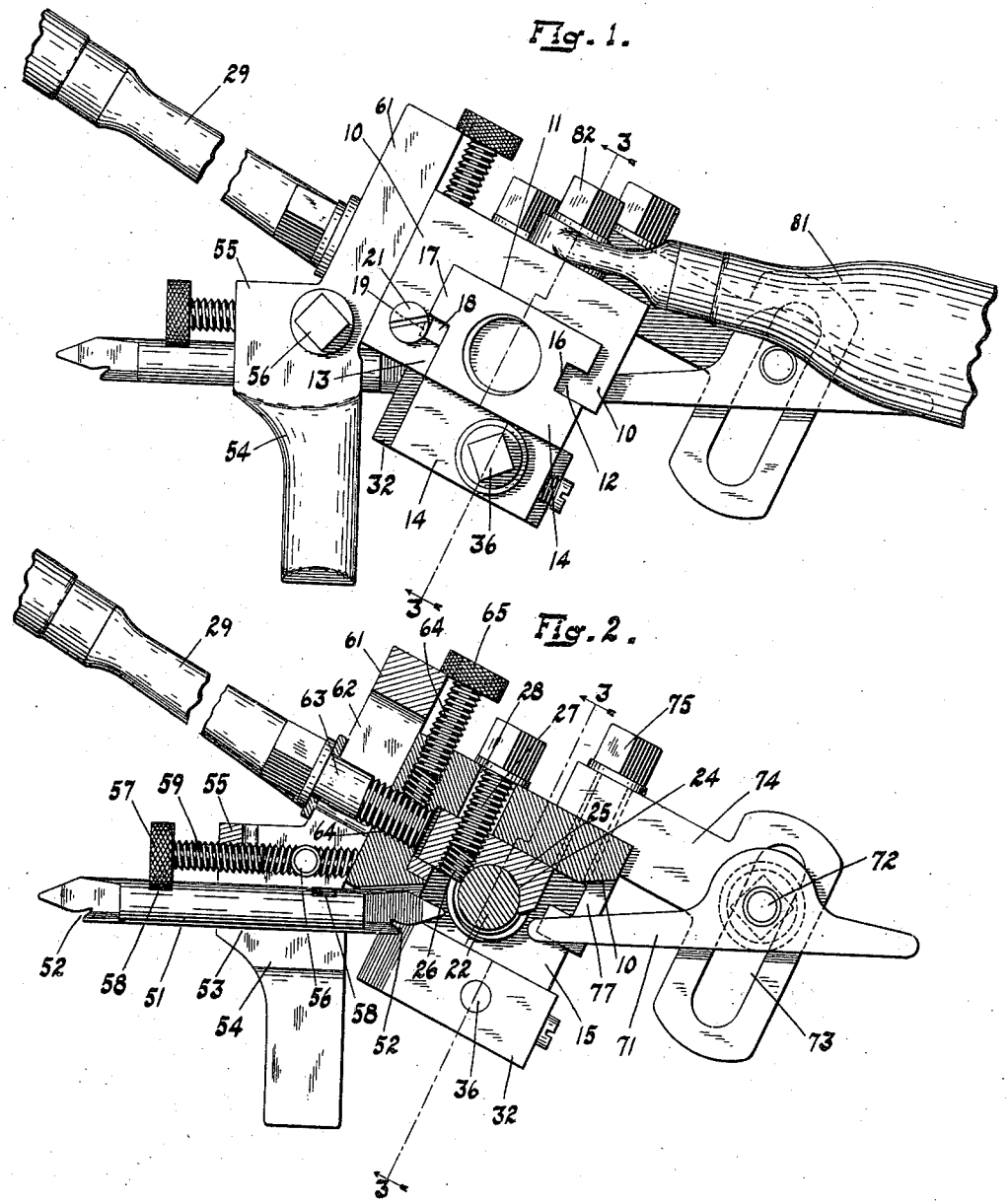
Witnesses
Walter Troemel.
Thomas W. McMeans
Inventor
John F. Pribnow.
by Bradford Hood
Attorneys.

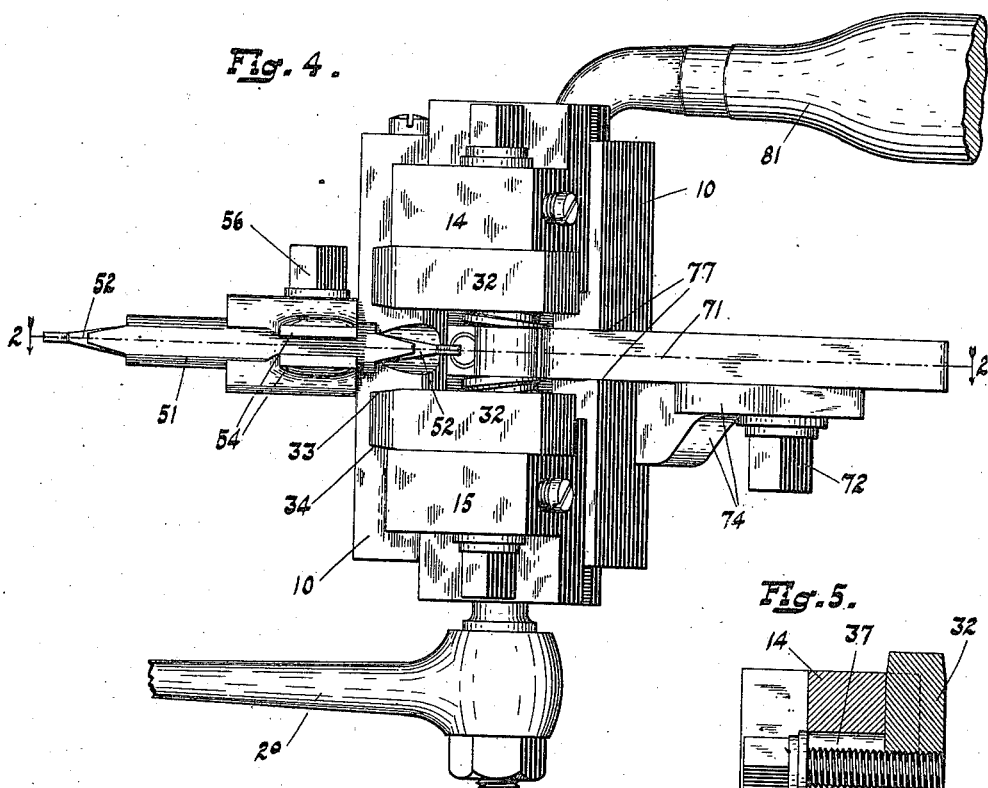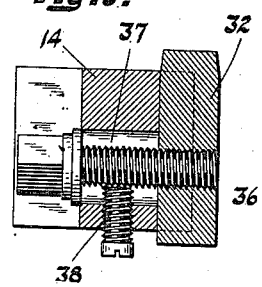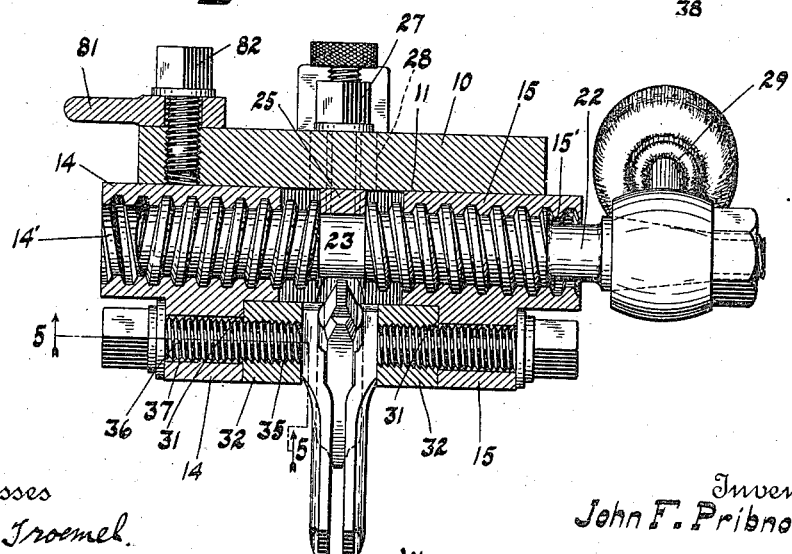

UNITED STATES PATENT OFFICE.

JOHN F. PRIBNOW, OF MELLEN, WISCONSIN.

SHAPER.

972,913.  Specification of Letters Patent.  Patented Oct. 18, 1910.

Application filed February 7, 1910. Serial No. 542,507.

*To all whom it may concern:*

Be it known that I, JOHN F. PRIBNOW, a citizen of the United States, residing at Mellen, in the county of Ashland and State of Wisconsin, have invented a certain new and useful Shaper, of which the following is a specification.

The object of my invention is to produce a tool by means of which swaged teeth of saws may be quickly and accurately shaped, the construction of the tool being such that it is compact, readily operated, easily adjusted to all possible forms of teeth, and easily and accurately manufactured and maintained in working condition.

The accompanying drawings illustrate my invention.

Figure 1 is a side elevation of my improved tool; Fig. 2 a section on line 2—2 of Fig. 4; Fig. 3 a section on line 3—3 of Figs. 1 and 2; Fig. 4 an under plan, and Fig. 5 a sectional detail on line 5—5 of Fig. 3.

In the drawings, 10 indicates a main body-block which is provided in one face with a continuous under cut channel 11 which extends from end to end of the block so that it may be readily machined and thus accurately formed. The main body 10 is provided with inwardly extending lips 12 and 13 which overhang the bottom of channel 11, as clearly indicated in Fig. 1. Slidably fitted in the channel 11 are two anvil carrying blocks 14 and 15 each of which is formed with a side groove 16 to receive and fit lip 12, and an extension 17 to lie beneath lip 13. The under face of lip 13 lies at an angle to the adjacent face of extension 17 so that an adjusting wedge or gib 18 may be inserted therebetween. This wedge 18 is provided near one end with a shoulder 19 against which the head of a retaining screw 21 will take, the said retaining screw 21 being threaded into the main body 10. The wedge 18 extends the entire length of the channel 11 so that its longitudinal adjustment will serve to simultaneously adjust the fit of blocks 14 and 15 in the main body 10.

Each of the blocks 14 and 15 is provided with a bore 14′ or 15′ which bores are oppositely threaded so as to receive the oppositely threaded portions of an operating screw 22. In order to hold the screw 22 against endwise movement, and thus cause opposite simultaneous movement of the two blocks 14 and 15, I provide said screw, at its middle, with a smooth journal 23 which fits in a socket or bearing 24 formed in the under face of a bearing block 25 which is formed to lie in the bottom of channel 11. Block 25 is provided with a transverse threaded opening 26 into which the threaded end of a cap screw 27 may pass, said screw 27 passing freely through a slot 28 formed through block 10 into the bottom of channel 11 and the head of said screw engaging the upper face of the block 10 so as to clamp the bearing block 25 firmly in position. This block 25 has a width equal to the axial length of the journal 23 and, being separate from block 10, it is possible to very cheaply and accurately produce the channel 11 and subsequently insert the block. Slot 28 permits an adjustment of block 25 axially of the screw. Screw 22 is provided at one end with a suitable operating lever 29.

Each block 14 and 15 is provided, at its inner end, with a transverse notch 31 in which is fitted a shaping anvil 32 provided at one end with a pair of beveled faces 33 and 34 either of which may be brought to working position by a reversal of the anvil in the notch 31. Each anvil is provided through its middle with a threaded opening 35 adapted to receive a clamping screw 36. The screw 36 passes through a slot 37 formed in the block adjacent the notch 31 so as to clamp the anvil in the notch. It is desirable to have the anvil longitudinally adjustable in its notch, and, therefore, the slot 37 in one of its dimensions is substantially equal to the diameter of the screw 36, as indicated in Fig. 3, while its other dimension is elongated, as indicated in Fig. 5. In order to serve as an abutment for screw 36 I provide a temper screw 38 which is projected into notch 37. By this arrangement the shaping anvil may be accurately adjusted in its carrier and with relation to its fellow, the angles of the shaping surfaces or portions of the anvils remaining constant throughout its adjustment.

It is essential that it be possible to accurately adjust the shaping surfaces of the shaping anvils with relation to the teeth of the saw to be operated upon and for that purpose I provide an abutment finger 51 having tooth-receiving notches 52 at its opposite ends. These opposite ends vary in thickness, as indicated in Fig. 4, so as to serve as a gage to limit the movement of the shaping anvils toward each other. The middle of finger 51 is substantially circular in cross section and fits in correspondingly formed grooves 53 formed in the adjacent surfaces of the arms 54, 54 of a carrier 55. A clamping screw 56 extends through the two arms 54 so that the finger 51 may be firmly clamped in any position of longitudinal adjustment. In order to accurately adjust the finger 51 I provide an adjusting screw 59 which is threaded into carrier 55, and is provided with a knurled head 57 which is adapted to take into either one of a pair of notches 58 formed transversely in pin 51 near its two ends. It will be noticed, from Fig. 2, that the threads for receiving the adjusting screw 59 are formed in the opposite faces of the two fingers 54 so that, when the clamping screw 56 is tightened it will serve not only to clamp the pin 51 but will also clamp the adjusting screw and thus render doubly sure the maintenance of adjusted position. Carrier 55 is provided with the slotted extension 61 which bears against one of the flat faces of the main body 10 and is provided with a slot 62 through which a clamping screw 63 is projected, the said clamping screw taking into the suitably threaded opening 64 formed in the main body 10. In order to adjust the carrier 55 accurately with relation to the main body 10, so as to move finger 51 transversely relative to and between the shaping anvils I provide the adjusting screw 64, which is threaded into the main body 10 and is provided with a knurled head 65 which overlaps and engages the upper end of extension 61.

In order to coöperate with the notched end of the finger 51 to form a support for the tool upon the ends of the teeth of the saw to be operated upon, I provide a rest 71 which is carried by a clamping screw 72. This clamping screw passes freely through a slot 73 formed in an arm 74 so that the rest may not only be adjusted pivotally upon the clamping screw 72 so as to fit any shape of saw, but may also be moved bodily in the length of the slot 73 so as to thus bring any desired portion of the shaping surface of the anvils into proper relation with the teeth of the saw. The arm 74 is firmly held in place by a clamping screw 75. A transverse notch 77 is formed in the main body 10, as shown in Fig. 2, in order to permit the extended end of rest 71 to approach, as closely as possible, the inner end of finger 51 and this projected end of the rest 71 fits closely transversely in the notch 77 as clearly shown in Fig. 4. The two fingers 54 are extended beyond pin 51 so that a saw may be projected between the fingers and the tool be thus positioned on the saw.

It will be noticed from the above that, by properly adjusting the shaping anvils, the abutment finger 51, the carrier and the rest 71, any desired relationship may be established between the shaping surfaces of the shaping anvils and the teeth of the saw to be operated upon, and that these adjustments, when once made, may be firmly maintained so that successive operations of the tool upon the different teeth of the same saw will produce uniform results.

The handle 81 is clamped to the main body 10, at the end opposite lever 29, by a clamping screw 82.

I claim as my invention:

1. A saw shaper comprising a main body-block having an under cut groove formed from end to end therethrough, a pair of correspondingly-shaped anvil carriers fitted in said groove, a clamping screw having opposite threads at its opposite ends threaded into the two anvil carriers, a lever secured to one end of said screw, a handle secured to the main body, a journal formed on the screw between the threads thereof, a bearing block mounted in the groove of the main body and having a bearing adapted to receive the journal of the screw, a shaper anvil mounted upon each anvil block, and means for clamping said anvil in position and for longitudinally adjusting said anvil upon its block.

2. A saw shaper comprising a main body-block having an under cut groove formed from end to end therethrough, a pair of correspondingly-shaped anvil carriers fitted in said groove, a tapered gib mounted in said groove between overlapping portions of the body and blocks, means for holding said gib in longitudinal adjustment, a clamping screw having opposite threads at its opposite ends threaded into the two anvil carriers, a lever secured to one end of said screw, a handle secured to the main body, a journal formed on the screw between the threads thereof, a bearing block mounted in the groove of the main body and having a bearing adapted to receive the journal of the screw, a shaper anvil mounted upon each anvil block, and means for clamping said anvil in position and for longitudinally adjusting said anvil upon its block.

3. A saw shaper comprising a main body-block having an under cut groove formed from end to end therethrough, a pair of correspondingly-shaped anvil carriers fitted in said groove, a clamping screw having opposite threads at its opposite ends threaded into the two anvil carriers, a lever secured to one end of said screw, a handle carried by the main body, a journal formed on the screw between the threads thereof, a bearing block mounted in the groove of the main body and having a bearing adapted to receive the journal of the screw, an abutment finger, a carrier for said finger, means for clamping said carrier upon the main body, means for adjusting said carrier bodily on the main body, and means for adjusting the finger axially in its carrier.

4. A saw shaper comprising a main body-block having an under cut groove formed from end to end therethrough, a pair of correspondingly-shaped anvil carriers fitted in said groove, a clamping screw having opposite threads at its opposite ends threaded into the two anvil carriers, a lever secured to one end of said screw, a handle secured to the main body, a journal formed on the screw between the threads thereof, a bearing block mounted in the groove of the main body and having a bearing adapted to receive the journal of the screw, an abutment finger, a carrier for said finger, means for clamping said carrier upon the main body, means for adjusting said carrier bodily on the main body, means for adjusting the finger axially in its carrier, a rest coöperating with said finger, a clamping screw upon which said rest is pivoted, and a slotted support carried by the main body and adapted to receive said clamping screw and rest.

In witness whereof, I have hereunto set my hand and seal at Indianapolis, Indiana, this 3rd day of February, A. D. one thousand nine hundred and ten.

JOHN F. PRIBNOW. [L. S.]

Witnesses:
 ARTHUR M. HOOD,
 FRANK A. FAHLE.